United States Patent Office 3,775,395
Patented Nov. 27, 1973

3,775,395
METHOD FOR PREPARING AZOBISVALERO-NITRILES
Shunichi Koyanagi, Kinya Ogawa, and Kenichi Taguchi, Naoetsu, Japan, assignors to Shinetsu Chemical Company
Filed June 30, 1970, Ser. No. 51,395
Claims priority, application Japan, July 7, 1969, 44/54,020; Mar. 24, 1970, 45/24,649
Int. Cl. C07c 107/02
U.S. Cl. 260—192
13 Claims

ABSTRACT OF THE DISCLOSURE

When ketones, hydrogen cyanide or alkali cyanide, and hydrazines are reacted in an aqueous medium containing some surface active agents, with the pH of the reaction medium kept substantially in the range between 6.0 and 11.0, and subsequently hydrazo compound thus prepared is oxidized, azobisvaleronitrile represented by:

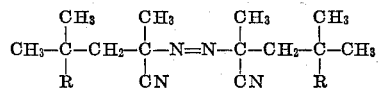

(where R is either a hydrogen atom or a radical selected from the group consisting of alkyl radical, alkoxy radical, and aryl radical) is obtained in good yield.

SUMMARY OF THE INVENTION

This invention relates to an improved method for preparing azobisvaleronitriles.

It has been well known that azobisvaleronitriles such as 2,2′-azobis-(2,4,4-trimethylvaleronitrile), 2,2′-azobis-(2,4-dimethylvaleronitrile) are excellent initiators in radical polymerization of vinyl monomers such as vinylchloride or acrylonitrile. Among the methods for preparing such azobisvaleronitriles there is a well-known one of reacting the starting material of ketones with sodium cyanide and hydrazine hydrochloride in an aqueous medium and then oxidizing either in water or alcohol the resultant hydrazo compound with bromine (c.f. U.S. Pat. No. 2,515,628). However, in such a case the higher the molecular weight of ketone used as a raw material, the much more insoluble would it be in water, making it difficult for the reaction system to be kept uniform and causing a remarkable reduction in yield of hydrazo compound. In order to improve the solubility of said ketone in water, it is known to add dioxane or ethanol to the aqueous medium, but in this case, too, the yield of hydrazo compound will not be improved well enough to make the method practicable in the industrial production.

Another well-known method (c.f. U.S. Pat. No. 2,586,995) for preparing azobisvaleronitriles involves, in the first place, synthesizing ketazine from ketone and hydrazine hydrate, and then bringing it in contact with liquid hydrogen cyanide to give hydrazo compound by addition reaction, which is subsequently oxidized in water or alcohol. By this method, the yield of hydrazo compound will be a little raised over the one given by the former method, but this advantage is more than counterbalanced by the trouble of having to prepare ketazine as an intermediate, making the process too complicated to be adopted in the commercial production.

An object of the present invention is to provide an advantageous method, free from the faults given above, for preparing azobisvaleronitriles, and another object of the invention is to provide a method for preparing, at an accelerated reaction velocity, azobisvaleronitriles from ketones, hydrazines and cyanide compound in remarkably improved yield.

The azobisvaleronitriles prepared by the method of the present invention are represented by the general formula:

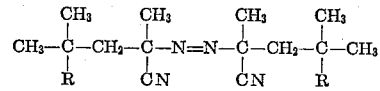

(where R is a hydrogen atom; or an alkyl radical such as $CH_3$ or $C_2H_5$; or an alkoxy radical such as $OCH_3$, $OC_2H_5$, $OC_3H_7$ or $OC_4H_9$; or an aryl radical such as $C_6H_5$).

The method of the invention is characterized by reacting ketones with cyanide compounds (selected from the group consisting of hydrogen cyanide and alkali cyanide) and hydrazines in an aqueous medium containing some surface active agent(s), with the pH of said reaction medium kept substantially in the range between 6.0 and 11.0 and subsequently oxidizing the resultant hydrazo compounds into azobisvaleronitriles.

To give a more detailed description of the invention, it is based on our observations that in reacting ketones with hydrogen cyanide (or alkali cyanide) and hydrazines, the presence of some surface active agent(s) in the reaction medium, while the pH of the reaction medium is substantially kept in the range between 6.0 and 11.0, or more preferably between 6.0 and 9.0, the ketones, which is hardly soluble in water, will be kept in emulsified state and that the presence of the surface active agent(s) will enable the reaction proceed smoothly among the ketone, the water-soluble hydrazine and hydrogen cyanide or alkali cyanide, and that side reactions will be suppressed by the control of pH, so that said azobisvaleronitriles will be given in extremely good yield.

By the method of the prior art, ketone and hydrazine compound were added to an aqueous medium, to which was added hydrogen cyanide or aqueous solution of alkali cyanide so as to be reacted under cooling. In such a case, there was a large variety in the initial pH value of the reaction medium: e.g., when hydrazine hydrate $$(NH_2NH_2 \cdot H_2O)$$

was employed as hydrazines, the initial pH value of the reaction system would be between 10.0 and 11.0; in the case of dihydrazine sulfate [$(NH_2NH_2)_2 \cdot H_2SO_4$] it would be between 3.0 and 4.0, and in that of hydrazine sulfate ($NH_2NH_2 \cdot H_2SO_4$), it would be between 0.5 and 1.0. Furthermore, in carrying out the reaction, the amount of cyanide (e.g. alkali cyanide) required was at least 1.1 times or more preferably from 1.3 to 2.0 times its reaction equivalent, so that as the reaction proceeded, the pH of the reaction medium invariably became strongly alkaline. Thus depending upon the kinds of the raw materials employed, the reaction medium would either be strongly alkaline or strongly acid. Consequently in such a case hydrogen cyanide and others accumulated in the reaction medium were apt to cause some side reactions to take place—dangerous reactions such as gelling of the reactants accompaneid by a sudden exothermic reaction, or decomposition of the intermediate cyanhydrine. Such dangers would be further attended by the disadvantages of a great reduction in yield of the product. When the pH of the reaction medium was above 11.0 or below 6.0, the surface active agent whose use is proposed in the present invention would get deteriorated under the influence of the pH value, and the deterioration would prevent the surface active agent from giving full play to its ability of enhancing the solubility of ketone in the aqueous medium, thereby helping the reaction proceed the more advantageously.

However, when, in accordance with the method of the present invention some surface active agent is employed in carrying out the reaction, while the pH of the reaction medium is kept in the range between 6.0 and 11.0, or more preferably between 6.0 and 9.0, all the disadvantages given above will be removed and azobisvaleronitrile can be obtained in high yield.

The kind of ketones employed as a raw material is selected, in accordance with the kind of azobisvaleronitrile which is the desired product and which is represented by the above-given general formula, from the group consisting of methylisobutyl ketone, 4-methoxy-4-methyl pentanone - 2, 4-ethoxy - 4 - methylpentanone-2, methylneopentyl ketone, and methyl-beta-phenyl isobutyl ketone. Hydrazines are exemplified by hydrazine hydrate, dihydrazine sulfate, hydrazine sulfate and hydrazine hydrochloride; and cyanide compound is exemplified by hydrogen cyanide, or alkali cyanide such as potassium cyanide and sodium cyanide.

In practicing the method of the invention, 1 mole of ketone is mixed with 0.4–0.7 mole of hydrazine and 1.0–2.0 moles of cyanide compound and the quantity of water employed as a reaction medium had better be from 0.5 to 2.0 times the weight of the ketone.

For the purpose of improving the solubility of ketone in the reaction medium so as to let the reaction proceed advantageously, some surface active agent is to be added to the medium as mentioned above. Such a surface active agent is selected from the group consisting of anionic surface active agents, e.g., alkylaryl sulfonate, alkyl sulfonate, aliphatic acid amide sulfate, alkyl sulfate, and sulfosuccinic acid ester; cationic surface active agents, e.g., higher amine salts of halogenic acid, alkyl pyridine hydrohalide, polyoxyalkylene alkylamine, polyoxyethylene alkyl amide and quaternary ammonium salts; and nonionic surface active agents, e.g., polyoxyethylene alkyl ether, polyoxyethylene alkyl ester and block copolymers of polyoxyethylene and polyoxypropylene. In accordance with the kind of ketone and hydrazine used as raw materials, either one or more kinds of these surface active agents may be selectively employed, more preferably, anionic surface active agents and nonionic surface active agents. As to the quantity of the surface active agent added, if an excessive amount is used, it will be adsorbed by the hydrazo compound prepared, and its removal will be difficult, resulting in the deterioration of the quality of the finished product, so that the amount of the surface active agent employed had better be from 0.5 to 5.0% by weight, or more preferably from 1.0 to 3.0% by weight, based on the weight of ketone employed as the raw material.

In practicing the method of the invention, said surface active agent may be employed together with some water-soluble polymer(s) such as polyvinyl alcohol, partially saponified polyvinyl acetate, cellulose derivatives) methyl cellulose, hydroxypropyl methylcellulose, etc.) and polyvinyl pyrrolidone. Such an addition helps to carry out the reaction with greater stability, which brings about higher yield of the finished product. Just as in the case of the surface active agent, either one or more kinds of these additives may be selectively employed. However, if an excessive amount of them is used, the viscosity of the reaction system will become too high, while, if the amount is too small, no involution effect of the additive(s) with the surface active agent can be expected, so that it is advisable that the amount is from 0.1 to 3% by weight, or more preferably from 0.5 to 2.0% by weight, based on the weight of the ketone employed as the raw material.

In practicing the method of the invention, the specified quantities of surface active agent, ketone and hydrazine are added, for example, to water, and the mixture is uniformly stirred into an emusion to which is added hydrogen cyanide or an aqueous solution of alkali cyanide, under cooling, taking care so that the pH of the reaction medium may be substantially kept in the range between 6.0 and 11.0 or more preferably between 6.0 and 9.0 so as to give hydrazo compound which is the intermediate. The control of the pH of the reaction medium is conducted by the following method.

When alkali cyanide is employed as a cyanide compound and hydrated hydrazine is employed as hydrazines, the control of the pH of the reaction medium can be carried out by the addition of an aqueous solution of sulfuric acid together with alkali cyanide, but when dihydrazine sulfate, hydrazine sulfate or hydrazine hydrochloride is used as hydrazines, an aqueous solution of alkali cyanide in such an amount as to be from 80 to 90% of the neutralization equivalent of the hydrazine should be added beforehand to the reaction medium so that its pH may be from acid to neutral, before the above-given control of the pH is carried out. On the other hand, when hydrogen cyanide is used as a cyanide compound and hydrazine hydrate is employed as hydrazines, a buffer solution of an inorganic salt, such as sodium bicarbonate, sodium carbonate, sodium formate, sodium acetete, sodium hydrogen phosphate and sodium dihydrogen phosphate, had better be added to the reaction medium beforehand in an amount of from 0.1 to 2.0 percent by weight based on the weight of ketone contained in the medium, and then hydrogen cyanide is to be mixed with the reaction medium while its pH is controlled. In another case when hydrogen cyanide is used as a cyanide compound and dihydrazine sulfate, hydrazine sulfate or hydrazine hydrochloride is used as hydrazines, an aqueous solution of hydroxide of an alkali metal such as sodium hydroxide, or potassium hydroxide is to be added beforehand to the reaction medium so that the pH of the medium may be from acid to neutral, and then to the medium is to be added the above-mentioned inorganic salt, followed by an addition of hydrogen cyanide by dropping while the pH is controlled. But of the two kinds of cyanides, it is more preferable to use alkali cyanide than hydrogen cyanide which is injurious to health.

Usually the reaction starts with the addition of the reactants at a temperature below 10° C., and it is completed in from 60 hours to 300 hours, for which period the mixture is let to stand between 15° and 30° C. If the reaction time is under 60 hours, the preparation of hydrazo compound will not be sufficiently conducted, and unreacted ketone will remain in the reaction medium, making the crystallization of the hydrazo compound difficult, but even if it is over 300 hours, no greater improvement in yield of the product can be expected. The hydrazo compound thus obtained is subsequently oxidized into an azo compound by the well-known following method. In the first place in water or an aqueous solution of alcohol such as ethanol, or an aqueous solution of hydrochloric acid or an aqueous solution of alcohol and hydrochloric acid are suspended the crystals of the hydrazo compound in such an amount that it may be from 20 to 30% by weight based on the weight of the solution, and while keeping it in a temperature range between −10° and 10° C., or more preferably between −5° and 5° C. by stirring, either chlorine gas is introduced into it or bromine or an ethanol solution of bromine is dropped into it. The amount of the oxidizing agent such as chlorine or bromine is from 1.1 to 2.0 times, or more preferably from 1.2 to 1.5 times its stoichiometric amount required for oxidizing said hydrazo compound.

When the hydrazo compound is oxidized and the hydrochloric acid byproduced is filtered away, azobisvaleronitrile is obtained in crystals, which, then, is washed several times in cold water and dried either under reduced pressure or by the fluidized drying method, at low temperature. If necessary, it may be dissolved in methanol, ethanol, ethyl ether, mixed solvent of methanol and water or of ethanol and water, and recrystallized for purification.

The invention will now be described by several examples and controls, in which parts and percent are all parts and percent by weight.

EXAMPLE 1

In a reactor equipped with a stirrer and a cooling device were placed 100 parts of water, 100 parts of methyl isobutyl ketone, 45 parts of hydrated dihydrazine sulfate and 2 parts of oleic acid amide sodium sulfate, and after the mixture was well stirred into an emulsion, 110 parts of 20% aqueous solution of sodium cyanide were added in order to keep the pH of the reaction medium at 7.0 while the reactor was cooled from outside with ice water. Subsequently, 257 parts of 20% aqueous solution of sodium cyanide and 98 parts of 50% sulfuric acid were dropped into the reaction medium, under cooling, taking care so that the pH of the medium might be in the range between 6.0 and 9.0, and the reaction was conducted at a temperature between 5° and 8° C.

After the dropping of the sodium cyanide solution and sulfuric acid was over, the inside temperature of the reactor was raised to 20° C., at which temperature the mixture was let to stand for about 100 hours. The hydrazo compound in crystals thus prepared was then taken out, washed three times with water and placed in 300 parts of water whose temperature was kept between 0° and 5° C. by stirring, and then chlorine gas was introduced into it so that oxidization of the hydrazo compound might take place. Subsequently the product was taken out and washed with cold water, obtaining 118 parts of 2,2′-azobis-(2,4-dimethylvaleronitrile). The yield of the finished product against the amount of the raw material ketone employed was 95.2%.

CONTROL 1

In an emulsion prepared just as in Example 1 and kept at a temperature between 6° and 10° C. were dropped 367 parts of 20% aqueous solution of sodium cyanide, and subsequently 98 parts of 50% sulfuric acid were dropped into it, while the temperature of the mixture was kept between 3° and 6° C. so as to give hydrazo compound. During the reaction, the pH of the reaction medium varied from 3 to the maximum of about 13.5.

Then the hydrazo compound was oxidized just as in Example 1, obtaining 99.5 parts of 2,2′-azobis-(2,4-dimethylvaleronitrile), whose yield against the amount of the raw material ketone employed was 80.2%.

CONTROL 2

In a reactor equipped with a stirrer and a cooling device were placed 100 parts of water, 100 parts of methyl isobutyl ketone and 45 parts of hydroneutral hydrazine sulfate, and after the mixture was well stirred into an emulsion, 110 parts of 20% aqueous solution of sodium cyanide were added in order to keep the pH of the reaction liquid proved at 7.5, while the reactor was cooled from outside with ice water. Subsequently, 257 parts of 20% aqueous solution of sodium cyanide and 98 parts of 50% sulfuric acid were dropped into the reaction medium under cooling, taking care so that the pH of the medium might be in the range between 6.0 and 9.0, and the reaction was conducted at a temperature between 5° and 8° C.

Subsequently just as in Example 1 the temperature of the mixture was raised, and the crystallization and oxidization of the hydrazo compound was conducted obtaining 51.1 parts of white crystals of 2,2′-azobis-(2,4-dimethylvaleronitrile), having a purity of 97.8%. The yield of the finished product against the amount of the raw material ketone employed was 41.2%.

CONTROL 3

An experiment was conducted just as in Control 1 except that no surface active agent was employed in it. As the result only 43.4 parts of 2,2′-azobis-(2,4-dimethylvaleronitrile) were obtained whose yield against the amount of the raw material ketone employed was 35.0%.

EXAMPLE 2

In a reactor equipped with a stirrer and a cooling device were placed 100 parts of water, 100 parts of methyl isobutyl ketone, 31.2 parts of 80% hydrated hydrazine and 2 parts of oleic acid amide sodium sulfate, and after the mixture was well stirred into an emulsion, 1 part of sodium bicarbonate was added. While the reactor was cooled so that the inside temperature might be kept in the range between 5° and 10° C., 40 parts of liquid hydrogen cyanide were dropped into the mixture, whose pH proved to be 7.5 at the time the dropping of the liquid hydrogen cyanide was finished, although it had been 10.2 at the beginning.

Subsequently just as in Example 1 the temperature of the mixture was raised, and the crystallization and oxidization of the product was conducted, obtaining 117.2 parts of white crystals of 2,2′-azobis-(2,4-dimethylvaleronitrile), having a purity of 98.5%. The yield of the finished product against the amount of the raw material ketone employed was 93.2%.

CONTROL 4

In a reactor equipped with a stirrer and a cooling device were placed 100 parts of water, 100 parts of methyl isobutyl ketone and 31.2 parts of 80% hydrazine hydrate, and after the mixture was well stirred about 1 hour, 1 part of sodium bicarbonate was added. While the reactor was cooled so that the inside temperature might be kept in the range between 5° and 10° C., 40 parts of liquid hydrogen cyanide were dropped into the mixture, whose pH proved to be 7.8 at the time the dropping of the liquid hydrogen cyanide was finished, although it had been 10.4 at the beginning.

Subsequently just as in Example 2 the temperature of the mixture was raised, and the crystallization and oxidization of the resultant hydrazo compound was conducted, obtaining 61.6 parts of white crystals of 2,2′-azobis-(2,4-dimethylvaleronitrile), having a purity of 98.0%. The yield of the finished product against the amount of the raw material ketone employed was 53.0%.

EXAMPLE 3

In a reactor equipped with a stirrer and a cooling device were placed 114 parts of water, 114 parts of methyl neopentyl ketone, 45 parts of hydrated dihydrazine sulfate and 2.3 parts of dodecyl benzene sodium sulfonate, and after the mixture was well stirred into an emulsion, 110 parts of 20% aqueous solution of sodium cyanide was dropped as it was stirred at a temperature between 5° and 8° C. so that the pH of the reaction medium at 7.4. Subsequently, 257 parts of 20% aqueous solution of sodium cyanide and 98 parts of 50% sulfuric acid were dropped into the mixture, taking care so that the pH of the medium might be in the range between 6.0 and 9.0, and the reaction was conducted at a temperature between 3° and 6° C.

After the reaction liquid was treated just as in Example 1, and the resultant hydrazo compound was further oxidized, obtaining 75.0 parts of 2,2′-azobis-(2,4,4-trimethylvaleronitrile), having a purity of 97.5%. The yield of the finished product against the amount of the raw material ketone employed was 53.0%.

EXAMPLE 4

In a reactor equipped with a stirrer and a cooling device were placed 130 parts of water, 130 parts of 4-methoxy-4-methylpentanon-2, 45 parts of hydrated dihydrazine sulfate and 2.6 parts of a block copolymer (H.L.B.-16.0) of polyoxyethylene and polyoxypropylene, and after the mixture was well stirred into an emulsion, 110 parts of 20% aqueous solution of sodium cyanide were added in order to keep the pH of the reaction medium at 7.2, while the temperature of the mixture was kept between 5° and 8° C. Subsequently, 257 parts of 20% aqueous solution of sodium cyanide and 98 parts of 50% sulfuric acid were dropped into the mixture, taking care so that the pH of the medium might be in the range between 6.0 and 9.0, and the reaction was conducted at a temperature between 5° and 8° C.

After the mixture was treated just as in Example 1, and the resultant hydrazo compound was further oxidized, obtaining 115 parts of 2,2'-azobis-(2,4-dimethyl - 4 - methoxy valeronitrile), having a purity of 98.0. The yield of the finished product against the amount of the raw material ketone employed was 73.0%.

EXAMPLE 5

In a reactor equipped with a stirrer and a cooling device were placed 100 parts of water, 100 parts of methyl isobutyl ketone, 65 parts of hydrazine sulfate and 2 parts of oleic acid amide sodium sulfate, and after the mixture was well stirred into an emulsion, 200 parts of cooled 20% aqueous solution of sodium cyanide was dropped as it was stirred at a temperature between 5° and 10° C. so that the pH of the reaction medium might be kept at 7.0, and into the mixture were dropped 147 parts of 20% aqueous solution of sodium cyanide, and 49 parts of 50% sulfuric acid, taking care so that the pH of the medium might be always in the range between 6.0 and 9.0, and that the reaction might proceed at a temperature between 5° and 8° C.

Subsequently, just as in Example 1, heating, crystallization and oxidization were carried out, obtaining 115 parts of 2,2'-azobis-(2,4-dimethylvaleronitrile), having a purity of 98.3%. The yield of the finished product against the amount of the raw material ketone employed was 91.0%.

EXAMPLE 6

An experiment was conducted just as in Example 1, except that 34.3 parts of hydrazine hydrochloride were employed instead of 45 parts of hydrated dihydrazine sulfate, obtaining 113 parts of 2,2'-azobis-(2,4-dimethylvaleronitrile), having a purity of 98.7%. The yield of the finished product against the amount of the raw material ketone employed was 90.0%.

EXAMPLE 7

In a reactor equipped with a stirrer and a cooling device were placed 45 parts of hydrated dihydrazine sulfate, 114 parts of water, 114 parts of methyl neopentyl ketone, 2.3 parts of a block copolymer (H.L.B.: 4.0) of polyoxyethylene and polyoxypropylene and 1.14 parts of polyvinyl alcohol (degree of saponification: 88%, and degree of polymerization: 1800), and after the mixture was well stirred into an emulsion, 110 parts of 20% aqueous solution of sodium cyanide was dropped as it was stirred at a temperature between 5° and 10° C. so that the pH of the reaction medium might be kept at 7.2, and into the mixture were dropped 257 parts of 20% aqueous solution of sodium cyanide, and 98 parts of 50% sulfuric acid, taking care so that the pH of the medium might be always in the range between 6.0 and 9.0, and that the reaction might proceed at a temperature between 3° and 6° C.

Subsequently, just as in Example 1, heating, crystallization and oxidization were carried out, obtaining 86.1 parts of 2,2'-azobis-(2,4,4-trimethylvaleronitrile) having a purity of 97.0%. The yield of the finished product against the amount of the raw material ketone employed was 60.5%.

CONTROL 5

To an emulsion prepared just as in Example 7 and kept at a temperature between 5° and 8° C. were added, by dropping, 367 parts of 20% aqueous solution of sodium cyanide, followed by another addition, also by dropping, of 98 parts of 50% aqueous solution of sulfuric acid, while the temperature of the mixture was kept between 3° and 5° C. The pH of the reaction medium, which, at the beginning, was in the neighborhood of 3, proved to be as high as 13.8 at the termination of the reaction. Subsequently, the mixture was treated just as in Example 1, and the resultant hydrazo compound was further oxidized, obtaining 72.7 parts of 2,2'-azobis-(2,4,4-trimethylvaleronitrile), having a purity of 97.5%. The yield of the finished product against the amount of the raw material ketone employed was 51.3%.

EXAMPLE 8

In a reactor were placed all the starting materials mentioned in Example 1 except 45 parts of hydrated dihydrazine sulfate which were replaced by 31.2 parts of 80% hydrazine hydrate, and after the mixture was stirred for about 1 hour, it was cooled to a temperature between 5° and 8° C., to which were added, while stirring, 367 parts of 20% aqueous solution of sodium cyanide and 98 parts of 50% aqueous solution of sulfuric acid, taking care so that the pH of the reaction medium might be kept in the range between 6 and 9. The rest of the treatment was conducted just as described in Example 1, obtaining hydrazo compound, which, when oxidized, gave 116 parts of 2,2'-azobis-(2,4-dimethylvaleronitrile) in white crystals, having a purity of 98.0%. The yield of the finished product against the amount of the raw material ketone employed was 91.5%.

EXAMPLE 9

In a reactor were placed all the starting materials mentioned in Example 1, and after the mixture was well stirred, 50 parts of 40% aqueous solution of caustic soda were dropped into it at room temperature so that the pH of the reaction medium might be 7.6, and subsequently to the mixture was added 0.5 part of sodium bicarbonate. As the mixture was cooled to a temperature between 5° and 10° C., 40 parts of liquid hydrogen cyanide were dropped into it while it was stirred, thereby carrying out the reaction. The pH of the reaction medium at the time of the termination of the reaction was 7.2. The rest of the treatment was conducted just as described in Example 1, obtaining hydrazo compound, which, when oxidized, gave 117 parts of 2,2'-azobis-(2,4-dimethylvaleronitrile) in white crystals, having a purity of 98.0%. The yield of the finished product against the amount of the raw material ketone employed was 92.5%.

What is claimed is:

1. In a method for preparing an azobisvaleronitrile having the formula

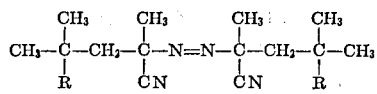

in which R is hydrogen, alkyl, alkoxy or aryl, by reacting a 2-substituted-isobutyl ketone, a hydrazine and a cyanide to produce a hydrazo compound and oxidizing the hydrazo compound to produce said azobisvaleronitrile, wherein the improvement comprises said ketone, said hydrazine, and said cyanide are reacted substantially simultaneously to produce said hydrazo compound in an aqueous medium which has a pH of 6.0–11.0 and contains a surfactant, selected from the group consisting of alkylaryl sulfonate, alkyl sulfonate, aliphatic acid amide sulfate, alkyl sulfate, sulfosuccinic acid ester, polyoxyethylene alkyl ether, polyoxyethylene alkyl ester and block copolymers of polyoxyethylene and polyoxypropylene, said surfactant being present in an amount sufficient to emulsify said ketone.

2. The improvement of claim 1 wherein said surfactant is present in an amount of from 0.5% to 5% by weight, based on the weight of the ketone.

3. The improvement of claim 1 wherein said medium additionally contains a water soluble polymer selected from the group consisting of polyvinyl alcohol partially saponified polyvinyl acetate methyl cellulose, hydroxypropyl methyl cellulose polyvinyl pyrrolidone.

4. The improvement of claim 3 wherein said polymer is present in an amount of 0.1% to 3% by weight, based on the weight of the ketone.

5. The improvement of claim 1 wherein said ketone said hydrogen cyanide or alkali cyanide and said hydrazine are respectively present in a molar weight ratio of 1:1–2:0.4–

0.7 and said aqueous medium contains 0.5 to 20 times by weight of water based on the weight of the ketone.

6. The improvement of claim 1 wherein said ketone is selected from the group consisting of 4-ethoxy-4-methyl-pentanone-2, methyl neopentyl ketone, and methyl-beta-phenyl isobutyl ketone, and methyl-beta-phenyl isobutyl ketone, and said hydrazine is selected from the group consisting of hydrated hydrazine, dihydrazine sulfate, hydrazine sulfate and hydrazine hydrochloride.

7. The improvement of claim 1 wherein said reacting step is carried out at a temperature of at most 30° C. and for a period of at least 60 hours.

8. The improvement of claim 7 wherein said temperature is at most 10° C. and said period is from 60 to 300 hours.

9. The improvement of claim 1 wherein said hydrazo compound is produced by reacting the ketone with hydrazine hydrate and sodium cyanide or potassium cyanide, and adding an aqueous solution of sulfuric acid to the reaction medium with the sodium or potassium cyanide.

10. The improvement of claim 1 wherein said hydrazo compound is produced by reacting the ketone with dihydrazine sulfate, hydrazine sulfate or hydrazine hydrochloride, and sodium cyanide or potassium cyanide, adding an aqueous solution of the sodium or potassium cyanide to the reaction medium in an amount of 80 to 90% of the neutralization equivalent of the hydrazine compound, and then simultaneously adding an aqueous solution of alkali cyanide and an aqueous solution of sulfuric acid to the reaction medium.

11. The improvement of claim 1 wherein said hydrazine is hydrazine hydrate and said cyanide is hydrogen cyanide, and said reacting step is carried out in the presence of from 0.1 to 2.0% by weight, based on the weight of the ketone, of an inorganic salt selected from the group consisting of sodium bicarbonate, sodium carbonate, sodium formate, sodium acetate, sodium hydrogen phosphate, and sodium dihydrogen phosphate, and then additional hydrogen cyanide is added to the reaction medium.

12. The improvement of claim 1 wherein said cyanide is hydrogen cyanide, said hydrazine compound is dihydrazine sulfate, hydrazine sulfate or hydrazine hydrochloride, said reacting step is carried out in the presence of sodium or potassium hydroxide, after addition of said hydroxide, 0.1 to 2.0% by weight of an inorganic salt, based on the weight of the ketone, is added to said medium followed by another addition of hydrogen cyanide, and said organic salt is selected from the group consisting of sodium bicarbonate, sodium carbonate, sodium formate, sodium acetate, sodium hydrogen phosphate and sodium dihydrogen phosphate.

13. The improvement of claim 1 wherein in said reacting step an aqueous mixture of the ketone, the hydrazine and the surfactant is emulsified, then the cyanide is added thereto.

References Cited
UNITED STATES PATENTS

| | | | |
|---|---|---|---|
| 2,492,763 | 12/1949 | Pinkney | 260—192 |
| 2,515,628 | 7/1950 | Castle | 260—192 |
| 2,586,995 | 2/1952 | Robertson | 260—192 |
| 2,605,260 | 7/1952 | Johnson | 260—152 X |

LEWIS GOTTS, Primary Examiner

C. F. WARREN, Assistant Examiner

U.S. Cl. X.R.

260—465 E, 465.5 R